Figure 1:
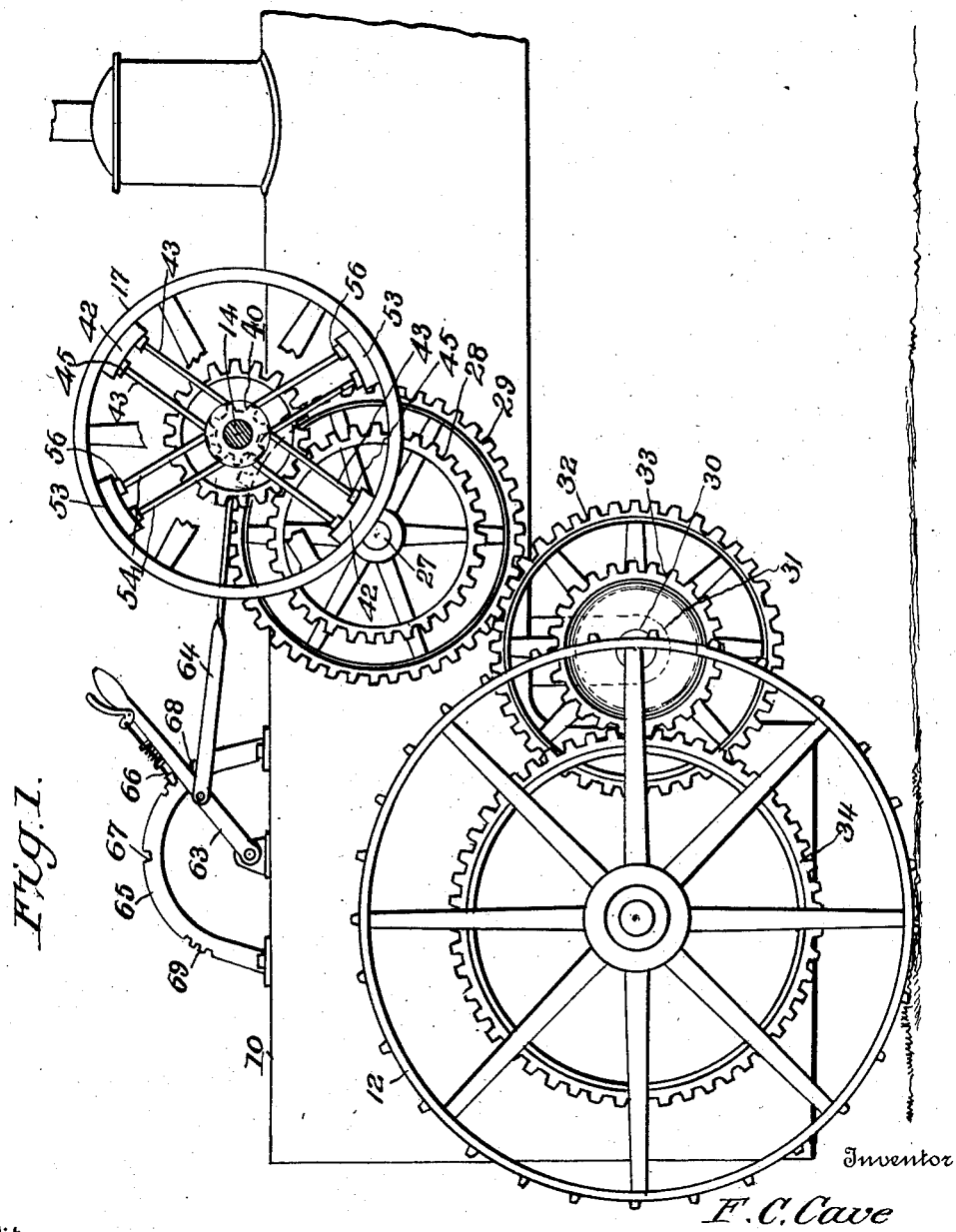

F. C. CAVE.
GEARING.
APPLICATION FILED MAR. 24, 1911.

1,011,409.

Patented Dec. 12, 1911.

3 SHEETS—SHEET 1.

Witnesses

Inventor
F. C. Cave

By

Attorneys.

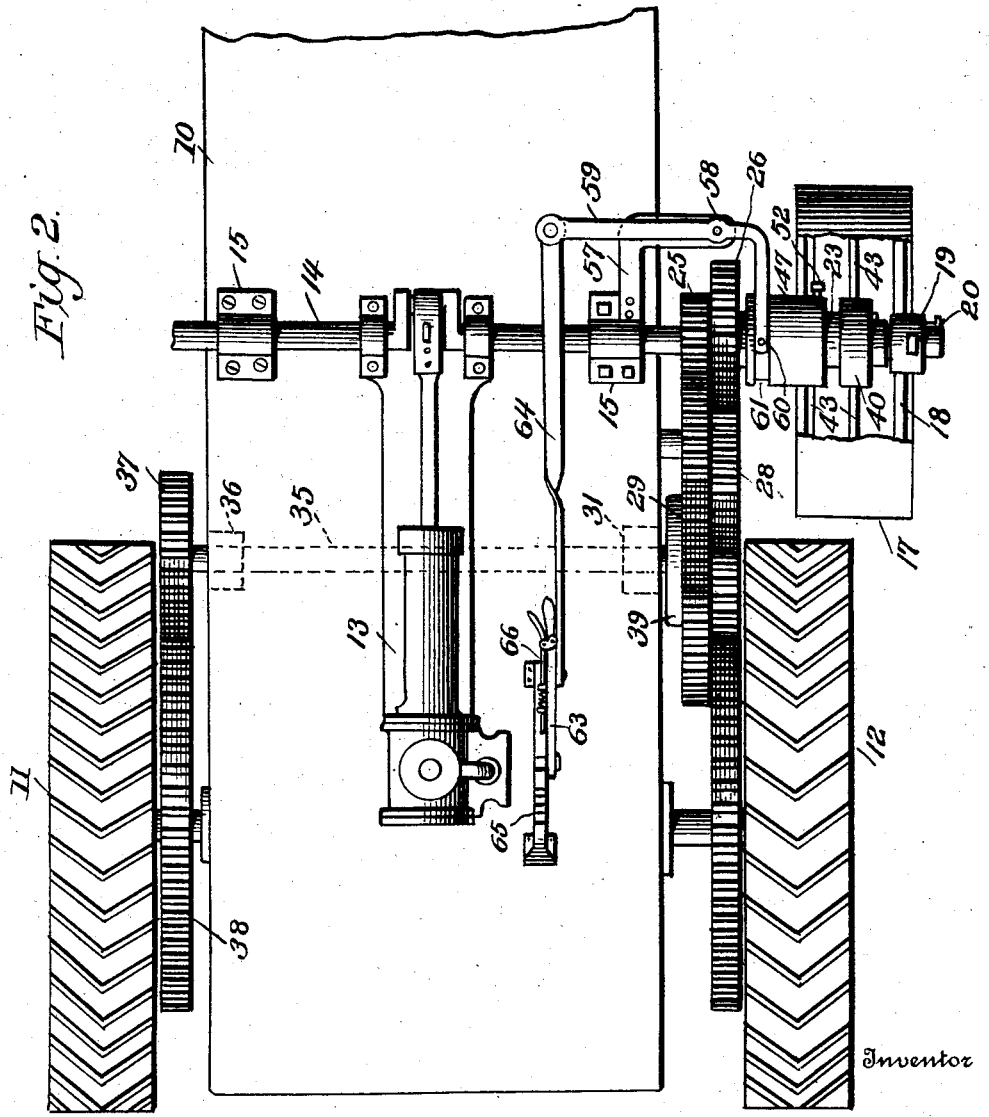

F. C. CAVE.
GEARING.
APPLICATION FILED MAR. 24, 1911.
1,011,409.
Patented Dec. 12, 1911.
3 SHEETS—SHEET 3.
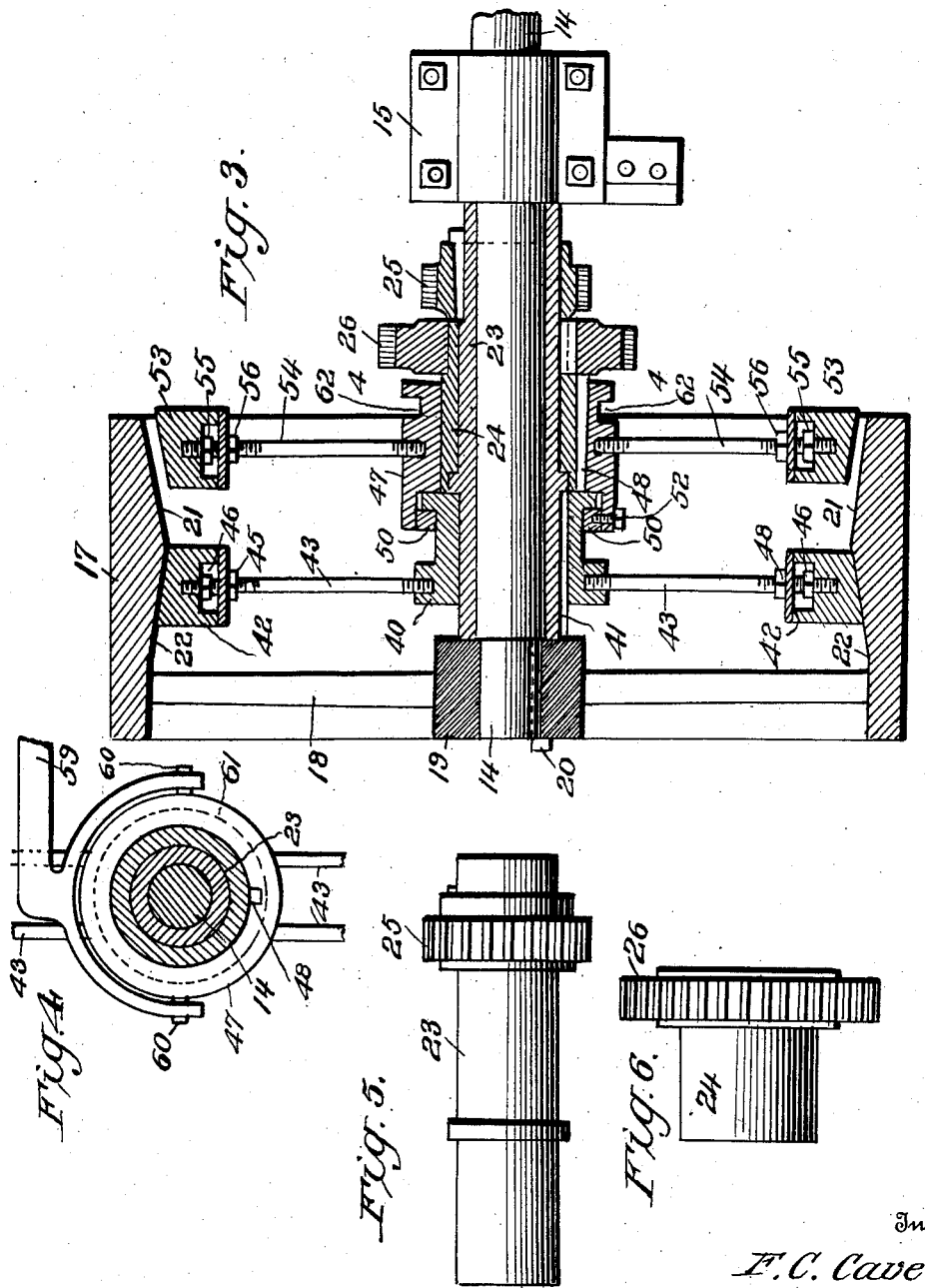
Witnesses
Inventor
F. C. Cave
By
Attorneys.
COLUMBIA PLANOGRAPH CO., WASHINGTON, D. C.

UNITED STATES PATENT OFFICE.

FREDERICK C. CAVE, OF LISBON, NORTH DAKOTA, ASSIGNOR OF ONE-THIRD TO RUSH S. ADAMS AND ONE-THIRD TO PATRICK H. ROURKE, OF LISBON, NORTH DAKOTA.

GEARING.

1,011,409.  Specification of Letters Patent.  Patented Dec. 12, 1911.

Application filed March 24, 1911. Serial No. 616,661.

*To all whom it may concern:*

Be it known that I, FREDERICK C. CAVE, citizen of the United States, residing at Lisbon, in the county of Ransom and State of North Dakota, have invented certain new and useful Improvements in Gearing, of which the following is a specification.

This invention relates to improvements in gearing, more particularly to gearing employed in connection with traction engines, and has for one of its objects to provide an apparatus of this character wherein provision is made for driving the traction portion of the machine at two speeds, and with means for changing the speed without stopping the engine.

Another object of the invention is to provide a device of this character whereby two different speeds may be imparted to the traction portion of the apparatus and the engine uncoupled from the driving mechanism.

With these and other objects in view the invention consists in certain novel features of construction as hereinafter shown and described and then specifically pointed out in the claims, and in the drawings illustrative of the preferred embodiment of the invention, Figure 1 is a side elevation of a conventional traction engine with the improvement applied; Fig. 2 is a plan view of the same, with a portion of the rim of the combined clutch and balance wheel broken away; Fig. 3 is an enlarged section of the clutch mechanism; Fig. 4 is an enlarged detail view in section on the line 4—4 of Fig. 3; Fig. 5 is a detached view of the longer and smaller sleeve and the smaller or low speed pinion; and Fig. 6 is a similar view of the shorter and larger sleeve with the larger or high speed pinion.

Corresponding and like parts are referred to in the following description and indicated in all the views of the accompanying drawings by the same reference characters.

The improved apparatus may be applied without material structural changes to engines and boilers of any of the various makes of traction engines, and for the purpose of illustration is shown applied to a conventional boiler and traction mechanism, in which 10 represents the boiler, as a whole, 11—12 the traction wheels, 13 the engine, and 14 the main driving shaft of the engine and mounted for rotation in bearings 15 upon the boiler. Connected to the overhanging end of the shaft 14 is a combined drive and flywheel, including the rim 17, spokes 18 and hub 19, the latter being rigidly connected to the shaft, as by a key 20. The spokes 18 and hub 19 are located adjacent to the outer edge of the rim, and the inner face of the rim 17 is formed with two tapering clutch faces 21—22, the clutch faces preferably being reversely arranged, as shown. Each of the clutch faces is provided with an independent clutch mechanism, as hereinafter described.

Mounted for rotation upon the shaft 14 is a relatively long sleeve or hollow shaft 23, and mounted for rotation upon the sleeve or shaft 23 is another and shorter sleeve or hollow shaft 24. The hollow shaft 23 carries a relatively small gear pinion 25, while the shorter hollow shaft or sleeve carries a larger gear pinion 26. Mounted for rotation upon a stub shaft 27 connected to the boiler 10 is a double gear 28 and 29, the gear 28 being the smaller and meshing with the pinion 26, while the gear 29 is larger and meshes with the smaller pinion 25.

Extending beneath the boiler 10 and in advance of the fire box portion of the same at one side of the center is a shaft 30, the shaft being supported in suitable bearings 31 connected to the front of the fire box of the boiler in the usual manner, as shown. Connected to the shaft 30 at one side is a gear 32 which engages constantly with the gear 29 and likewise carries a smaller gear 33 which meshes with the main drive gear 34 upon the traction wheel 12. Mounted for rotation upon the boiler 10 in advance of the fire box and at the opposite side is another shaft 35 which is supported by suitable bearings 36 upon the front of the fire box portion of the boiler and carries a relatively small gear 37 operating in constant engagement with the main drive wheel 38 of the traction wheel 11. The two shafts 30 and 35 are in longitudinal alinement transversely of the boiler and are supplied with a suitable differential gear, represented conventionally at 39, at their inner ends. By this arrangement it will be obvious that when rotary motion is applied to the hollow shaft or sleeve 23, motion will be imparted to the larger gear 29 through the pinion 25, and if motion be imparted to the shorter hollow shaft or sleeve 24, motion will be imparted through the smaller gear 28 at increased speed over that imparted by the sleeve 23. Thus two speeds may be imparted to the main traction wheels by imparting motion either to the sleeve 23 or to the sleeve 24.

Mounted upon the hollow shaft 23 within the drive wheel rim 17 is a hub 40, the hub being slidable upon the hollow shaft and arranged to be rotated therewith through the medium of a feather 41 operating in a corresponding guideway in the hub. Located adjacent to the beveled friction face 22 of the rim 17 are clutch shoes 42, and connected into the hub 40 at opposite sides are rods 43, the outer ends of the rods engaging in the shoes which are adjustably supported thereon by adjusting nuts 45—46. By this means the shoes are firmly coupled to the hub and at the same time adjustable relative to the friction face 22. By this means it will be obvious that when the hub 40 is moved toward the hub 19 of the main drive wheel the shoes 42 will be released from engagement with the clutch face 22, and when the direction of motion is reversed, or the hub 40 moved away from the hub 19, the shoes will be applied to the friction face 22. Slidably engaging over the shorter sleeve 24 is another hub 47 and arranged to be rotated with the sleeve through the medium of a feather key 48 operating in a corresponding guideway in the hub 47, so that while the hub 47 is slidable upon the shorter sleeve, it will be rotated therewith. The hub 47 is constructed to overhang the hub 40, as shown at 49, and is provided with an internal stop ring 50 which engages an outwardly directed annular flange 51 on the hub 40. The ring 50 may be coupled in any suitable manner detachably to the overhanging portion 49 of the hub 47, but a set screw 52 is shown employed for that purpose. By this arrangement it will be obvious that the two hubs 40—47 will be moved longitudinally of their respective sleeves 23 and 24, while at the same time free to be independently rotated with the sleeve.

Located within the rim 17 of the main fly-wheel are other clutch shoes 53 similar to the shoes 42, except that they are reversed in position and arranged to engage with the beveled clutch surface 21. The shoes 53 are coupled to the hub 47 by rods 54 and adjustable relative to the shoes by adjusting nuts 55—56 similar to the rods 43 and adjusting nuts 45—46. The clutch shoes 42—53 will be so arranged that when the shoes 42 are in engagement with the beveled clutch surface 22, the shoes 53 will be withdrawn from engagement with the clutch surface 21, and then when the shoes 53 are engaged with the clutch surface 21, the shoes 42 will be disengaged from the clutch surface 22.

Connected to some stationary portion of the engine, preferably to the nearest bearing 15, is a bracket 57, and pivoted at 58 to this bracket is a shipper arm 59 which is in turn pivotally connected at 60 to a shipper ring 61 fitting in an annular channel 62 in the hub 47. Connected to the boiler 10 or some other stationary portion of the engine and convenient to the hand of the engineer upon his platform is an operating lever 63 connected by a rod 64 to the shipper lever 59. The lever 63 is arranged to operate over a segment 65. The lever 63 is provided with a spring actuated pawl 66 which is adapted to engage in notches in the segment to hold the lever at any desired position. The segment 65 is provided with a central notch 67, a forward set of notches 68, and a rearward set of notches 69, and the parts are so arranged that when the lever 63 is located in its forward position, or with the pawl 66 in engagement with one of the series of notches 68, the shipper lever 59 will be arranged to move the hub 47 into position to connect the shoes 42 with the beveled friction surface 22 and thus couple the gear 26 with the smaller gear 28, and thus produce the rapid speed, while the smaller gear 25 is operated as an idler, or without producing any result. Then when the lever 63 is moved into its rearward position, or with the pawl 66 in engagement with one of the series of notches 69, the shipper lever 59 will be reversed in position and throw the clutch shoes 53 into engagement with the clutch surface 21 and likewise disconnect the clutch shoes 42 from engagement with the surface 22 and causing the gear 26 to run as an idler. It will be obvious that when the lever 63 is located in its vertical position, or with its pawl 66 in position to engage the central notch 67, both of the shoes 42 and 53 will be held out of engagement with both of the friction faces 21—22, or permit the engine to run without producing any result. The rods 43—44 being arranged in pairs and firmly anchored in the hubs and in the shoes, produce a very strong and durable clutch device and in which the shoes are readily adjustable to take up for wear or for other purposes.

The improved device is simple in construction, can be strongly and durably manufactured and enables the operator to control the speed of the engine as required and increase or decrease the speed without stopping the engine or dismounting from his platform, or disconnect the engine from the traction mechanism by simply locating the lever 63 centrally of the segment 65.

While I have shown the improved device applied to an ordinary steam boiler and engine, it will be understood that the invention may be employed upon traction engines driven by steam, hydrocarbon, alcohol, electricity, or other power without material structural changes.

Having thus described the invention, what is claimed as new is:

1. In a device of the class described, a driven shaft having a relatively small gear and a relatively large gear rotative therewith, a driving shaft, a driving wheel carried by said driving shaft, an inner sleeve loose upon said shaft, a relatively small pinion fast upon said inner sleeve and engaging the larger gear, an outer sleeve rotative upon said inner sleeve, a relatively large pinion carried by said outer sleeve and engaging said smaller gear, and means for alternately transmitting the motion of said drive wheel to said outer sleeve and inner sleeve.

2. In a device of the class described, a drive shaft, a clutch drum connected to rotate with said shaft and having two clutch faces, an inner sleeve mounted for rotation upon said shaft, an outer sleeve mounted for rotation upon said inner sleeve, two connected gears of different diameters, means for transmitting motion from said connected gears, a relatively small pinion connected to said inner sleeve and engaging the larger of said connected gears, a relatively large pinion connected to said outer sleeve and engaging the smaller of said connected gears, a hub slidable upon said inner sleeve and rotative therewith, another hub slidable upon said outer sleeve and rotative therewith, a clutch shoe connected to said inner sleeve hub and operative against one of said clutch drum faces, a clutch shoe connected to said outer sleeve hub and operative against the other of said clutch drum faces, coupling means between said hubs, and means for moving said hubs longitudinally of said sleeves.

3. In a device of the class described, a drive shaft, a clutch drum connected to rotate with said shaft and having two clutch faces, an inner sleeve mounted for rotation upon said shaft, an outer sleeve mounted for rotation upon said inner sleeve, two connected gears of different diameters, means for transmitting motion from said connected gears, a relatively small pinion connected to said inner sleeve and engaging the larger of said connected gears, a relatively large pinion connected to said outer sleeve and engaging the smaller of said connected gears, a hub slidable upon said inner sleeve and rotative therewith and provided with an annular stop rib, another hub slidable upon said outer sleeve and rotative therewith and provided with an annular recess to receive said stop rib, an annular stop ring within said annular recess and bearing against said stop rib, a clutch shoe connected to said inner sleeve hub and operative against one of said clutch drum faces, a clutch shoe connected to said outer sleeve hub and operative against the other of said clutch drum faces, coupling means between said hubs, and means for moving said hubs longitudinally of said sleeves.

In testimony whereof, I affix my signature in presence of two witnesses.

FREDERICK C. CAVE. [L. S.]

Witnesses:
R. S. ADAMS,
A. M. ROUNDY.

---

Copies of this patent may be obtained for five cents each, by addressing the "Commissioner of Patents, Washington, D. C."